United States Patent
Evans et al.

[11] Patent Number: 5,946,444
[45] Date of Patent: *Aug. 31, 1999

[54] SYSTEM AND METHOD FOR CREATING PERSONALIZED IMAGE COLLECTIONS FROM MULTIPLE LOCATIONS BY USING A COMMUNICATIONS NETWORK

[75] Inventors: James Gifford Evans, Colts Neck; Richard H. Janow, South Orange; Howard M. Singer, Marlboro; Lee B. Stahs, Oceanport, all of N.J.

[73] Assignee: Lucent Technologies, Inc., Murray Hill, N.J.

[*] Notice: This patent is subject to a terminal disclaimer.

[21] Appl. No.: 08/893,047

[22] Filed: Jul. 14, 1997

Related U.S. Application Data

[63] Continuation of application No. 08/606,255, Feb. 23, 1996, Pat. No. 5,694,514, which is a continuation of application No. 08/111,327, Aug. 24, 1993, abandoned.

[51] Int. Cl.⁶ ........................................... H04N 5/76
[52] U.S. Cl. ........................... 386/46; 386/117; 358/906.1
[58] Field of Search ................................. 386/46, 95, 45, 386/38, 107, 117, 108, 52; 348/159, 153; 358/906.1; H04N 5/76

[56] References Cited

U.S. PATENT DOCUMENTS

| | | | |
|---|---|---|---|
| 4,567,532 | 1/1986 | Baer et al. | 358/342 |
| 4,688,105 | 8/1987 | Bloch et al. | 358/342 |
| 4,712,103 | 12/1987 | Gotanda . | |
| 4,888,648 | 12/1989 | Takeuchi et al. | 355/335 |
| 4,943,854 | 7/1990 | Shiota et al. | 358/342 |
| 5,111,410 | 5/1992 | Nakayama et al. | 348/157 |
| 5,283,644 | 2/1994 | Maeno | 345/152 |
| 5,283,819 | 2/1994 | Glick et al. | 348/552 |
| 5,508,774 | 4/1996 | Klees . | |
| 5,694,514 | 12/1997 | Evans et al. | 386/46 |

FOREIGN PATENT DOCUMENTS

WO 94/22371 10/1994 WIPO .
WO 95/24795 8/1995 WIPO .

OTHER PUBLICATIONS

"Microwave/Radio Frequency Tags", D. Sarnoff Research Center, pp. 1–3.
Nippondenso, Fuji, Tokyo, Japan, p. 105.
"Breeders track ostriches", p. 1.
"2,400 shirts/hour!", Designer's Corner, Design News/Feb. 1, 1993/47.

*Primary Examiner*—Huy T. Nguyen

[57] ABSTRACT

A system for creating still image or video collections for guests of amusement parks and the like a) identifies individuals by a unique tag assigned to the individual, b) automatically records the images of the individuals while they are at various attractions, c) collects the images over a communications network, d) arranges the images in a collection, and e) presents a personal set of collected images to the guest. In one embodiment of the invention, cameras are located throughout an amusement park. Each guest is associated with a unique identifier. This identifier may be contained within a readable tag, e.g., a card, badge or pendant. Tag readers identify guest when they are at a particular location and provide identification and location information to a control system. A communications network is used to interconnect the cameras, tag readers, control system and image recording devices. The control system controls the recording and storage of the appropriate image (s) associated with that guest. In accordance with an aspect of the invention, the images of the guest may be associated with prerecorded images of the amusement park. Advantageously, a reporting system captures information on guest traffic patterns throughout their visit.

14 Claims, 4 Drawing Sheets

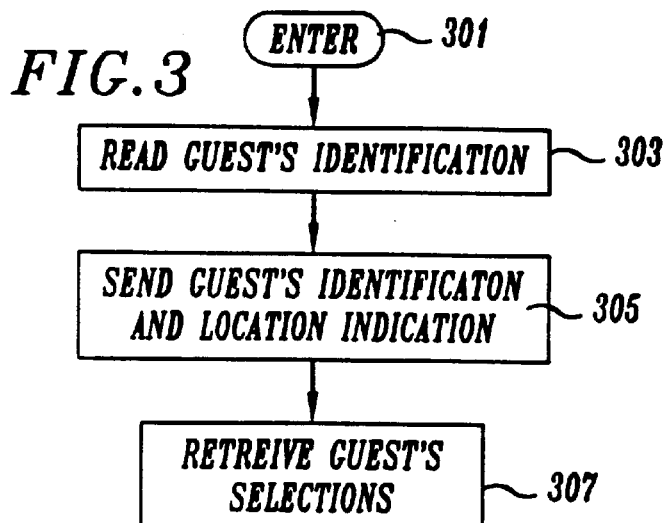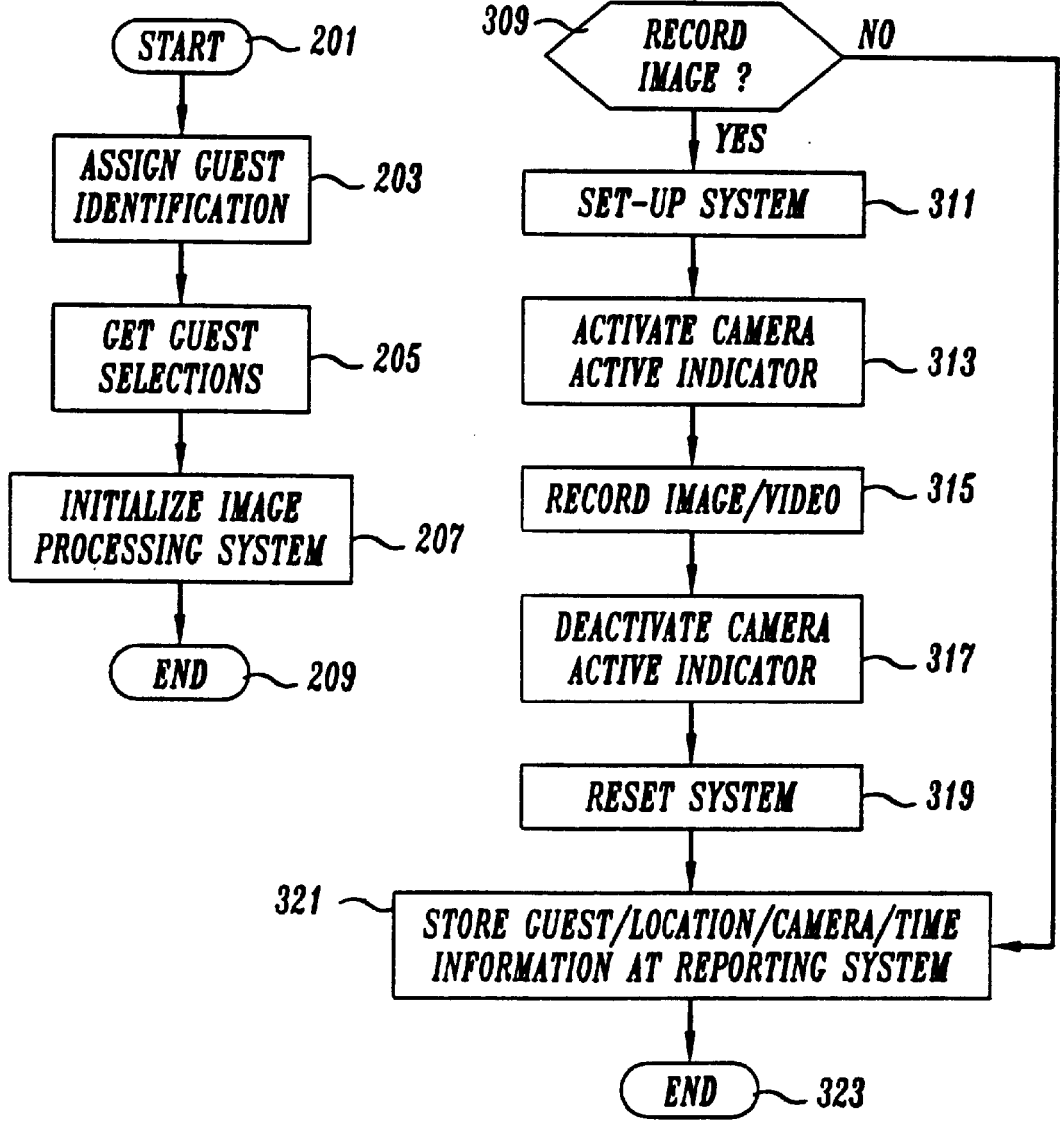

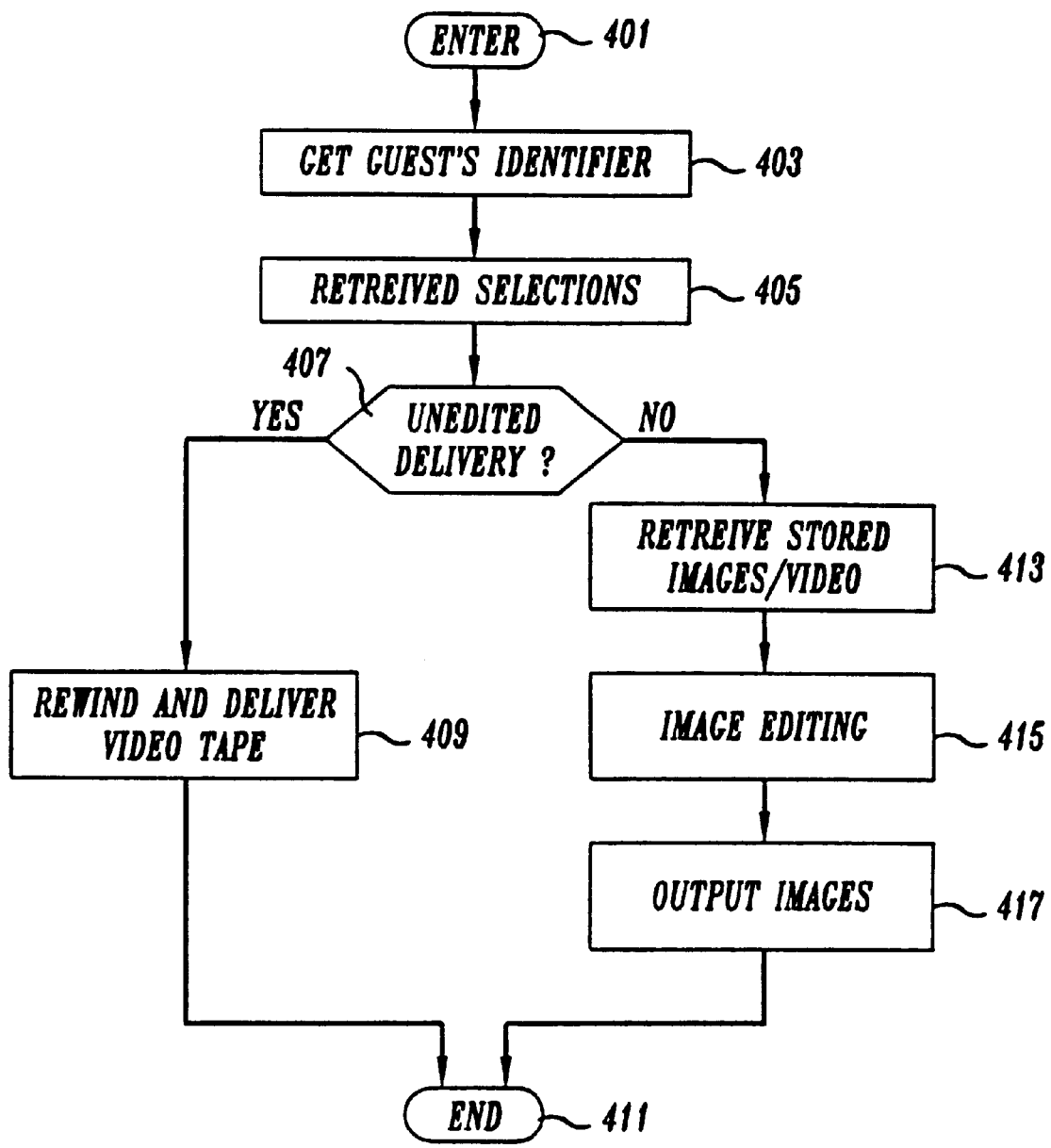

FIG. 5

| GUEST'S IDENTIFIER 503 | GUEST'S NAME 505 | GUEST'S ADDRESS 507 | VIDEO/STILL 509 | EDITING 511 | NUMBER OF ATTRACTIONS 513 | TAPE NO. 515 | MEDIA/FORMAT 517 | DELIVERED 519 |
|---|---|---|---|---|---|---|---|---|
| 12345 | MIKE EVANS | 1313 MOCKINGBIRD | VIDEO | NO | 5 | 1 | VHS | YES |
| 12346 | RICH JANOW | 1313 SPACELY TWR | STILL | YES | ALL | X | PHOTO CD | NO |
| 12347 | EUGENE ROSENTHAL | 1414 BEDROCK LA | VIDEO | YES | ALL | 2 | VHS | YES |
| 12348 | HOWIE SINGER | 1111 MAIN STREET | VIDEO | NO | 15 | 3 | BETA | NO |
| ... | ... | ... | ... | ... | ... | ... | ... | ... |
| 12349 | LEE STRAHS | 1616 TOON RD | STILL | YES | 10 | X | PRINTS | NO |

501

SYSTEM AND METHOD FOR CREATING PERSONALIZED IMAGE COLLECTIONS FROM MULTIPLE LOCATIONS BY USING A COMMUNICATIONS NETWORK

This is a Continuation of application Ser. No. 08/606,255 filed Feb. 23, 1996, U.S. Pat. No. 5,694,514, which in turn is a Continuation of application Ser. No. 08/111,327 filed Aug. 24, 1993, now abandoned.

TECHNICAL FIELD

This invention relates to image capture and particularly to the capturing and creation of customized videos or photo albums.

BACKGROUND OF THE INVENTION

Guests of amusement parks, golf courses, ski resorts and the like, often desire to capture a still image or video record of their visit. (The term "video" is used herein according to its conventional meaning and, therefore, includes any corresponding associated audio information.) To do so, they often must lug around with them still or video cameras and have somebody available who can take their picture. This tends to be inconvenient, especially for the person who has to do the picture-taking. In some cases there is no person available to do the picture-taking. As a result there are undesired gaps in the recorded images. Furthermore, it is not always possible to obtain the desired picture, because the camera cannot be situated in such a way as to capture the desired field of view. There also may be problems with lighting and motion.

One prior art solution is for the amusement park to provide a person whose responsibility it is to take particular predefined pictures which are then sold to the guest. Typically, this is limited to still pictures only. Another prior art solution is to have a camera trained at a fixed location for automatically capturing images in response to a mechanical switch or a radio signal. Such systems, however, are limited to capturing the object in which the triggering device is located. For example, in an amusement park setting, the triggering device would be located in each car of a ride. Each car is automatically photographed and the guest, upon conclusion of the ride, can decide if he wishes to purchase the individual picture. These prior art techniques are insufficient to provide a satisfying still image or video recollection for the guest.

SUMMARY OF THE INVENTION

The problems with prior art still image or video collection for amusement parks and the like are overcome, in accordance with the principles of the invention, by a) tagging individuals for identification, b) automatically recording the images of the tagged individuals while they are at various attractions, c) collecting the images over a communications network, and d) arranging the images in a collection. A personal set of collected images can then be presented to the guest.

In one embodiment of the invention, cameras are located throughout an amusement park. Each guest is associated with a unique identifier. This identifier may be contained within a tag, e.g., a card, badge or pendant that is "readable" from a distance. Tag readers identify guests when they are at a particular location and provide identification and location information to a control system. A communications network is used to interconnect the cameras, tag readers, control system and image recording devices. The control system controls the recording and storage of the appropriate image (s) associated with that guest. In accordance with an aspect of the invention, the images of the guest may be combined with prerecorded images of the amusement park. Advantageously, a reporting system may capture information on guest traffic patterns throughout their visit, thereby providing information on attraction usage to the operator of the amusement park.

BRIEF DESCRIPTION OF THE DRAWING

FIG. 2 shows an exemplary guest registration process performed at the amusement park;

FIG. 3 shows an exemplary process for recording still images or video in accordance with the principles of the invention;

FIG. 4 shows an exemplary process for final preparation and delivery of the completed image collection; and FIG. 5 shows an exemplary data structure for storing information in the control system of FIG. 1.

DETAILED DESCRIPTION

Figure 1:
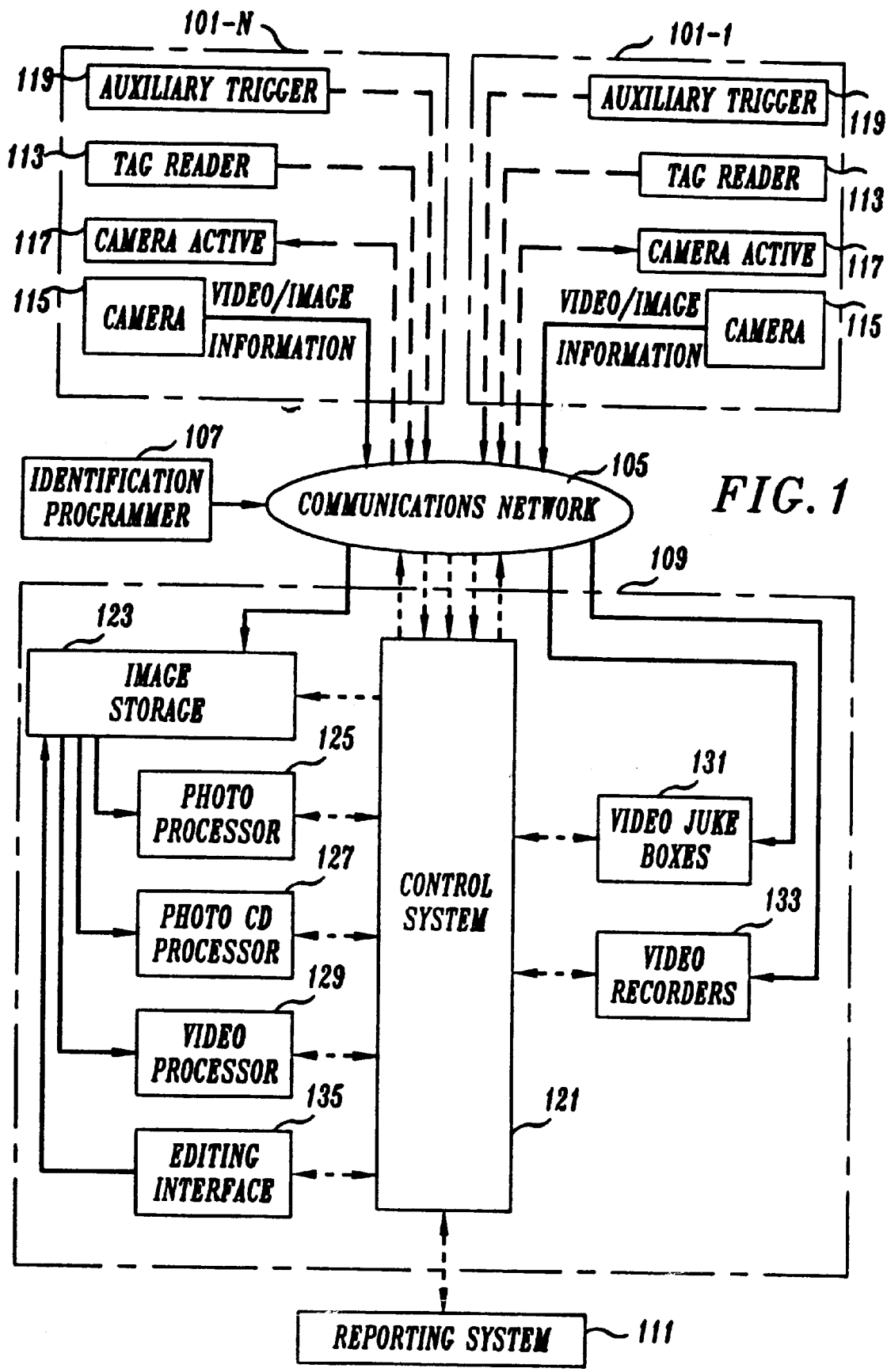
FIG. 1 shows an exemplary embodiment of the invention including attraction sites, a communications network, an identification programmer, an image processing system, and a reporting system.

The invention will be described herein in the context of an amusement park having rides and activities collectively known as attraction sites. An identification tag (not shown) is issued to each guest of the amusement park who wishes to have a personalized still image or video record of his visit automatically generated. The identification tags are used to activate cameras that have been strategically located at attraction sites throughout the park. Each camera is activated at the appropriate time and location for each guest. FIG. 1 shows an exemplary embodiment of the invention including a) attraction sites 101-1 through 101-N, collectively referred to herein as attraction sites 101, b) communications network 105, c) identification programmer 107, d) image processing system 109, and e) reporting system 111.

Identification programmer 107 associates a tag with a particular guest and stores selections associated with the guest. The selections include whether still image or video will be taken and at which, or how many, attraction sites the system will be enabled for recording images of that guest. The information is transmitted over communications network 105 to processing system 109, where it is stored FIG. 5 shows an exemplary data structure for storing information in control system 121.

Advantageously, identification programmer 107 can be located remotely from the amusement park, e.g., at a travel agent, to minimize preparation time at the park. Furthermore, the tag can be provided before arrival at the park and used as a ticket of admission. Identification programmer 107 can be 1) any conventional data entry device, e.g. a computer terminal, or 2) a combination data entry device and tag reader.

Each attraction site 101 includes at least tag reader 113 and camera 115. Each camera 115 is either a video or still image camera capable of remotely transmitting the images it captures. The various cameras 115 can have different characteristics. In particular, each camera 115 can be tailored to the requirements of the attraction site at which it is located, e.g., low light conditions, fast motion, auto-focus requirements or under water location.

Tag reader 113 reads the tags of guests when the guest approaches within its sensing range. Tag reader 113 transmits the identifier of the guest to image processing system 109 over communications network 105. In addition, tag reader 113 identifies itself to image processing system 109. This self-identification may be achieved by transmitting information that particularly identifies tag reader 113 or it may be implied from the connection of tag reader 113 to communications network 105.

In one embodiment of the invention, the tags are passive radio devices and the tag readers 113 are radio transmitters and receivers. Such a tag reader transmits a signal which is uniquely modulated by the passive radio device in the tag, in accordance with the prestored identification code, and is detected by the receiver in tag reader 113. Advantageously, in this embodiment of the invention, the guest is not required to take any action to activate tag reader 113 once he is within its range. It is noted that the principles for designing such passive radio systems are well known in the art. In addition, several systems for identifying things and/or people that employ passive radio systems are commercially available.

Optionally, each attraction site 101 can include camera active indicator 117 and auxiliary trigger 119. Camera active indicator 117 provides an indication to the guest that his image is being recorded. It is activated in response to a control signal from image processing system 109 via communications network 105. One example of a camera active indicator is a red light that is illuminated when an image is being recorded.

In certain applications, auxiliary trigger 119 provides a control signal to control recording of the signal supplied from camera 115, to insure that the guest's image is precisely captured. An auxiliary trigger is necessary when, for example, still images are taken of guests on fast moving attractions or to give guests control over the timing of the recording.

Communications network 105 can be any conventional communications network capable of transporting and switching video, still images, audio and data. Communications network 105 operates under the control of control system 121 in image processing system 109.

Image processing system 109 includes a) control system 121, b) image storage 123, c) photo processor 125, d) photo CD processor 127, e) video processor 129, f) video jukeboxes 131, g) video recorders 133, and h) editing interface 135.

In one embodiment, image storage 123 stores still images or video captured by cameras 115. The still images or video are supplied via communications network 105. Images are labeled with the 1) identifier of the guest, 2) the location of the camera, and 3) the time of day, which are supplied by the control system 121. Photo processor 125, photo CD processor 127 or video processor 129 process the stored images into the format desired by the guest, e.g., photographs, photo CD, or videotape. Optionally, editing interface 135 can be used to modify the stored images, e.g., cropping of the images and the addition of special effects, as well as to control the image selection and sequencing.

In another embodiment of the invention, only a video recording is produced. The patron's images are a) captured on cameras 115, b) transmitted by the communications network 105 under the control of the control system 121, and c) recorded in real time on either one of video jukeboxes 131 or one of video recorders 133. A video jukebox is a device, analogous to a convention record player jukebox, for automatically 1) loading, 2) playing or recording, and 3) replacing in its storage location each of the several video tapes stored in the jukebox. In the case of the video recorder 133, each guest desiring a video is assigned exclusively to a particular recorder for their visit. In the case of the video jukeboxes 131, guest's video tapes are loaded into the recorder automatically when they arrive at an attraction site 101, as indicated by tag reader 113 at that attraction site.

Advantageously, in accordance with an aspect of the invention, the video tapes employed in either of the foregoing embodiments are prerecorded with stock footage of the amusement park in general, and attraction sites 101 in particular. Upon a guest's arrival at one of attraction sites 101, the guest's video tape is cued up to the portion of the tape with the prerecorded material of that attraction site and the guest's video image from the appropriate one of cameras 115 is added at that point on the tape. Thus, the guest's video is combined with the remaining stock footage to create an exciting, personalized videotape. In accordance with an aspect of the invention, to minimize cuing delays, after each recording the tape is returned to its midpoint.

Reporting system 111 is a data collection and processing system. Control system 121 supplies to reporting system 111 information indicating each time that a guest came within range of one of tag readers 113 and the identifier of the guest. In particular, information concerning whether an image of the guest was recorded and any system status information. Advantageously, this information can be used by the operators of the amusement park to analyze the traffic patterns of guests to the various attraction sites.

Reporting system 111 may be a computer system, disk drive or any processing, storage or output device. Control system 121 can be a conventional computer system with multiple input/output ports. Those of ordinary skill in the art given the foregoing description will be able to design and program control system 121.

One embodiment of the invention the apparatus shown in FIG. 1 may be used in accordance with the processes shown in FIGS. 2, 3 and 4. In particular, FIG. 2 shows an exemplary guest registration process when guest registration is performed at the amusement park.

The process is entered in step 201, when the guest approaches identification programmer 107. In step 203, the guest is given an identification tag having a unique identifier. The guest's name and other identifying personal information is entered into identification programmer 107 as is the tag's identifier. This information is transmitted over communications network 105 to control system 121. The personal information and the unique identifier are associated together by control system 121, so that the guest can be identified from his identification tag.

Next, in step 205, the guest's selections are entered into identification programmer 107 and these are also stored in association with the unique identifier in control system 121. Again, the selections include whether still image or video will be taken and at which attraction site the system will be enabled for recording images of the guest. Again, FIG. 5 shows an exemplary data structure for storing information in control system 121.

Image processing system 109 is initialized in accordance with the selections of the guest, in step 207. Thus, for example, if the guest selected video, in an embodiment of the invention using video jukeboxes 131 or video recorders 133, the video tape is loaded for the guest in either video jukebox 131 or in one of video recorders 133. Furthermore, the particular video tape is associated with the guest by control system 121. If still images were selected by the guest, enough space to store the guest's still images is allocated in image storage 123. The process is exited in step 209 and the guest can continue his visit.

FIG. 3 shows an exemplary process for recording still images or video in accordance with the principles of the invention. The process is entered in step 301, when the guest approaches within the sensing range of one of tag readers 113. In step 303, tag reader 113 reads the identifier of the approaching guest from his tag. Next, in step 305, tag reader 113 transmits the identifier of the guest to image processing system 109 as well as an indication of its location. Thereafter, in step 307, control system 121 retrieves the guest's selections which were previously stored in the process shown in FIG. 2.

Conditional branch point 309 tests to determine if, according to the guest's selection, the guest's image should be recorded. If the test result is YES, control passes to step 311 in which the system is set up for recording. This includes, for video tapes being prepared in video jukeboxes 131 or video recorder 133, the cuing of the video tape to location corresponding to the attraction site 101 whose tag reader 113 was activated by the guest's tag. Step 311 also includes providing an image path from camera 115 through communications network 105 to the video tape of the guest or to image storage 123. Additionally, if an auxiliary trigger is required, the system waits until the auxiliary trigger associated with the particular cameras 115 is activated.

Control then passes to step 313, in which control system 121 transmits a signal causing the optional camera active indicator 117 associated with the camera 115 that is to capture the guest's image to activate. In step 315, the guest's image is recorded in either video jukebox 131, one of video recorders 133 or image storage 123. Upon conclusion of the recording, e.g., by expiration of a predetermined time, deactivation of auxiliary trigger 119, or by the guest moving out of the range of tag reader 113, control passes to step 317, in which the optional camera active indicator 117 is deactivated. Next, the system is reset for this guest in step 319. Resetting the system includes relinquishing the image path established in step 311 and, in the case of video tape recorders 133 or the video jukebox 131, returning the video tape to its midpoint.

If the step result in step 309 is NO, or at the conclusion of step 319, control passes to step 321, in which the guest, location, camera, and time information is supplied from control system 121 for storage in reporting system 111. The process then exits in step 323.

FIG. 4 shows an exemplary process for final preparation and delivery of the completed image collection. The process is entered in step 401, when the guest decides to obtain his completed image collection. The guest's identifier is obtained in step 403, e.g., by having the guest's tag read by a tag reader. Next, in step 405, the guest's selections are retrieved so that the appropriate final preparation can be completed.

Conditional branch point 407 tests to determine if the guest selected unedited delivery of a video tape. If the test result in step 407 is YES, control passes to step 409 in which the guest's video tape is rewound and retrieved from video jukeboxes 131 or video recorders 133. The video tape is then given to the guest. Control system 121 also stores an indication that the guest's tape has been delivered. The process then exits in step 411.

If the test result in step 407 is NO, control passes to step 413, in which the stored still images or video for the guest are retrieved from storage 123. In step 415, the guest indicates the particular editing he wishes for each image as well as the arrangement of the images that he desires. The guest performs the editing of this step using editing interface 135. Once editing is complete, control passes to step 417, in which the images are output according to the media and format selected by the guest in step 205 of the process shown in FIG. 2. The process then exits in step 411.

FIG. 5 shows table 501, an exemplary data structure for storing information in control system 121. Each row of table 501 corresponds to a particular guest and each column indicates a field in which that particular guest's information and/or options are stored. Guest's identifier field 503 stores the unique identifier assigned to each guest while guest's name field 505 and guest's address field 507 store, respectively, the guest's name and address. Video/still field 509 stores either the indication VIDEO if the guest has selected a video image collection or the indication STILL if the guest has selected a still image collection. If the guest desires editing of his images, editing field 511 will have the value YES. Otherwise, editing field 511 will have the value NO.

In this embodiment, the guest may select the number of attractions at which his image will be recorded, in increments of 5. Number of attractions field 513 stores the particular number of attractions selected by the guest or ALL, which indicates that the guest's image should be recorded at every attraction site the guest visits. Tape No. field 515 is for use in an embodiment where each guest who is to receive a video image collection is assigned an individual video tape. It indicates the particular video tape assigned to the guest. An "X" in Tape No. field 515 indicates that the guest is not receiving a video image collection. Media/Format field 517 indicates the particular medium, and format if applicable, of the image collection that is to be delivered to the guest.

Delivered field 519 indicates whether or not a guest's image collection has been delivered, e.g., handed over, to the guest. Initially, delivered field 519 is set to NO. When a guest's image collection is delivered the value of delivered field 519 is changed to YES.

The foregoing is merely illustrative. Those skilled in the art will be able to devise other embodiments of the invention. For example, in another embodiment of the invention the unique identifier of each guest need not be contained within a readable tag. Instead, the identifier may be a unique number that is told to the guest and each "tag reader" is a keyboard at which the guest may enter his identifier. In an alternative embodiment of the invention, the readable tags may be magnetically, optically, electrically or mechanically readable objects, e.g., cards. Furthermore, the tags may be made so that a guest may deactivate his tag to prevent his image from being recorded at particular attractions. This is useful so that a guest, especially one who only signed up to have his image recorded at a limited number of attraction sites, can better control at which, and in what order, his image is recorded.

As noted, communications network 105 can be any conventional communications network. In particular, communications network 105 can include elements of packet switching, circuit switching or both. The switching architecture of communications network 105 can be either centralized or distributed.

In one embodiment of the invention, identification programmer 107 can initially store and/or alter the identifier stored in a guest's tag. Also, multiple identification programmers may be interfaced to communications network 105. Some of the identification programmers may be located remotely and are connected by a telecommunications system, e.g., the public switch telephone network, to communications network 105.

In another embodiment of the invention, where video tapes are produced by using image storage 123 and video processor 129, the video tapes are recorded on as a guest progressively visits each attraction site. Instead of prerecording stock footage of the attraction sites on a guest's tape in a predetermined order, the appropriate stock footage is added along with the personal images for each guest. Advantageously, the ordering of the images of each attraction site may be arranged to correspond to the order in which the guest visited those attraction sites. Thus, a variety of real time and batch image processing can be used to generate the completed image collection.

In other embodiments of the invention, video jukeboxes 131 and video recordes 133 may be replaced by units that handle video disks instead of video tapes. Also, images could be retained locally at each camera site and downloaded upon demand to a central site when a guest goes to pick up his video. Furthermore, communications network 105 may be all or partly wireless, so that, for example, images could be communicated to image processing system 109 in wireless fashion. In addition, multiple tags may be associated together to allow a single still image collection or video collection to be made for an entire family.

We claim:

1. A method for use in collecting images of individuals at a plurality of geographically diverse attractions, said individuals being uniquely identifiable, the method comprising the steps of:
   a) detecting the identity of said individuals while they are at various ones of said plurality of geographically diverse attractions by means of a detector
   b) automatically capturing images of said individuals while they are at various ones of said plurality of geographically diverse attractions in response to the detection of the identity of said individuals;
   c) transmitting the images to a collection point over a communications network; and
   d) storing the images according to the identity of said individuals as detected by the detector.

2. A method comprising the steps of:
   capturing, for each of a plurality of geographically diverse locations, images of individuals, the individuals being detected as being present by a detector and identified at said each location, said capturing being in response to the detection of the presence and identification of said individuals;
   communicating the captured images of at least one of said individuals to a collection point; and
   assembling at said collection point according to the identity as detected by said detector of the at least one of said individuals collections of the images communicated thereto, said collections including images of respective different ones of said individuals.

3. The method as defined in claim 2, wherein in said capturing step each of said individuals is detected and individually identified by reading an identifying tag worn by that individual.

4. The method as defined in claim 3, wherein said tag is a passive radio-frequency-interrogable tag.

5. The method as defined in claim 2, wherein, for at least ones of said collections, the images thereof are assembled onto a common physical record medium.

6. The method as defined in claim 5, wherein said record medium is a disc.

7. The method as defined in claim 6, wherein said record medium is a tape.

8. The method as defined in claim 6, wherein in said assembling step, stock footage of at least ones of the location at which the respective individual was detected is included in the collection of images of that individual.

9. The method as defined in claim 5, wherein said images are video images.

10. The method as defined in claim 2, wherein, for at least ones of said collections, the images thereof are individual photographic images on respective record media assembled into a common physical stack.

11. A method for use in collecting images of individuals at a plurality of geographically diverse attractions, said individuals being uniquely identifiable, the method comprising the steps of:
    a) automatically detecting the identity of said individuals while they are at various ones of said plurality of geographically diverse attractions by means of a detector;
    b) automatically capturing images of said individuals while they are at various ones of said plurality of geographically diverse attractions;
    c) transmitting the images to a collection point over a communications network; and
    d) storing the images according to the detected identity of said individuals.

12. A method comprising the steps of:
    capturing, for each of a plurality of geographically diverse locations, images of individuals, the individuals being automatically detected as being present by a detector and identified at said each location;
    communicating the captured images of at least one of said individuals to a collection point; and
    assembling at said collection point according to the detected identity of the at least one of said individuals collections of the images communicated thereto, said collections including images of respective different ones of said individuals.

13. A method for use in collecting images of individuals at a plurality of geographically diverse attractions, said individuals being uniquely identifiable, the method comprising the steps of:
    a) detecting the identity of said individuals while they are at various ones of said plurality of geographically diverse attractions by means of a detector;
    b) automatically capturing images of said individuals while they are at various ones of said plurality of geographically diverse attractions in response to the detection of the identity of said individuals;
    c) transmitting the images to a collection point over a communications network;
    d) labeling the images according to the identity of the individuals; and
    e) storing the images in collections according to the identity of said individuals, wherein the images of a particular individual captured at different ones of said geographically diverse attractions are stored in a separate collection from the images of other individuals.

14. A method comprising the steps of:
    capturing, for each of a plurality of geographically diverse locations, images of individuals, the individuals being detected as being present by a detector and identified at said each location, said capturing being in response to the detection of the presence and identification of said individuals;
    communicating the captured images of at least one of said individuals to a collection point; p1 labeling the captured images according to the identity of the at least one of said individuals; and
    assembling at said collection point the images communicated thereto into at least one collection according to the identity of the at least one of said individuals, wherein the images of the at least one of said individuals captured at different ones of said geographically diverse locations are assembled in a separate collection from the images of any other individuals.

* * * * *